(12) United States Patent
Parker

(10) Patent No.: US 6,740,848 B2
(45) Date of Patent: May 25, 2004

(54) WELDING TORCH FOR USE IN GAS METAL ARC WELDING

(75) Inventor: Tracy Stephen Parker, Near Kidderminster (GB)

(73) Assignee: Parweld Limited (GB)

( * ) Notice: Subject to any disclaimer, the term of this patent is extended or adjusted under 35 U.S.C. 154(b) by 0 days.

(21) Appl. No.: 10/227,070

(22) Filed: Aug. 23, 2002

(65) Prior Publication Data

US 2003/0052111 A1 Mar. 20, 2003

(30) Foreign Application Priority Data

Aug. 24, 2001 (GB) ............................................. 0120682
Aug. 24, 2001 (GB) ............................................. 0120683

(51) Int. Cl.⁷ ............................................... B23K 7/10

(52) U.S. Cl. ............................ 219/137.31; 219/137.42

(58) Field of Search .................. 219/137.31, 137.42, 219/137.63

(56) References Cited

U.S. PATENT DOCUMENTS

| 4,543,461 A | | 9/1985 | Hill |
| 4,727,238 A | * | 2/1988 | Mann .................... 219/137.41 |
| 4,916,270 A | * | 4/1990 | West et al. .................... 219/70 |
| 5,260,546 A | * | 11/1993 | Ingwersen et al. ..... 219/137.31 |

FOREIGN PATENT DOCUMENTS

EP 0 689 895 A1 3/1996

* cited by examiner

Primary Examiner—Kiley Stoner
Assistant Examiner—Len Tran
(74) Attorney, Agent, or Firm—Iandiorio & Teska

(57) ABSTRACT

A welding torch (2) for use in gas metal arc welding, which welding torch (2) comprises a neck portion (4), a diffuser (6) at a first end (8) of the neck portion (4), a contact tip (10) which extends from the diffuser (6), connector means (12) which is at a second end of the neck portion (4) and which is for connecting the neck portion (4) to a power cable assembly (16), and a trigger switch (114): the power cable assembly being such that it supplies electricity and gas to the welding torch (2) with the gas being for protecting welds from atmospheric contamination as the welds are made using the welding torch (2); the neck portion (4) being such that it comprises an electrical conductor (20) and a passageway (22) for the gas; the neck portion (4) being such that it comprises insulation (26) in the form of an overmoulding of a plastics material, the overmoulding being such that it also provides rigidity and impact strength to the neck portion (4); the trigger switch (114) being a snap fit in position in a socket in the neck portion (4); and the welding torch (2) being one in which the trigger switch (114) comprises a housing (118) and a recess (120) at opposite ends of the housing (118), and in which walls (122) defining the socket (116) have male profiles (124) for being received in the recesses (120) in order to enable the snap fit in position of the trigger switch (114) in the socket (116).

4 Claims, 5 Drawing Sheets

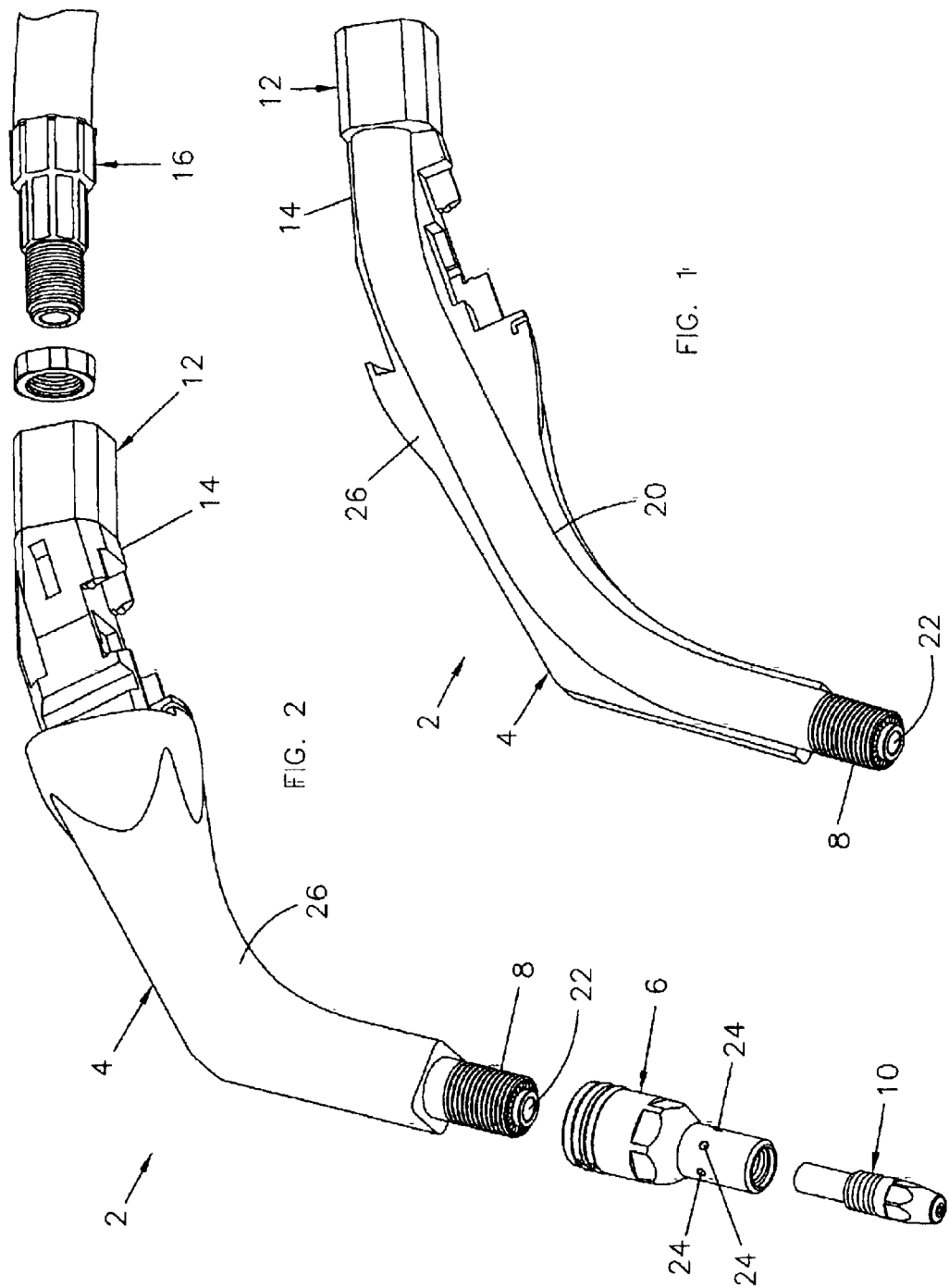

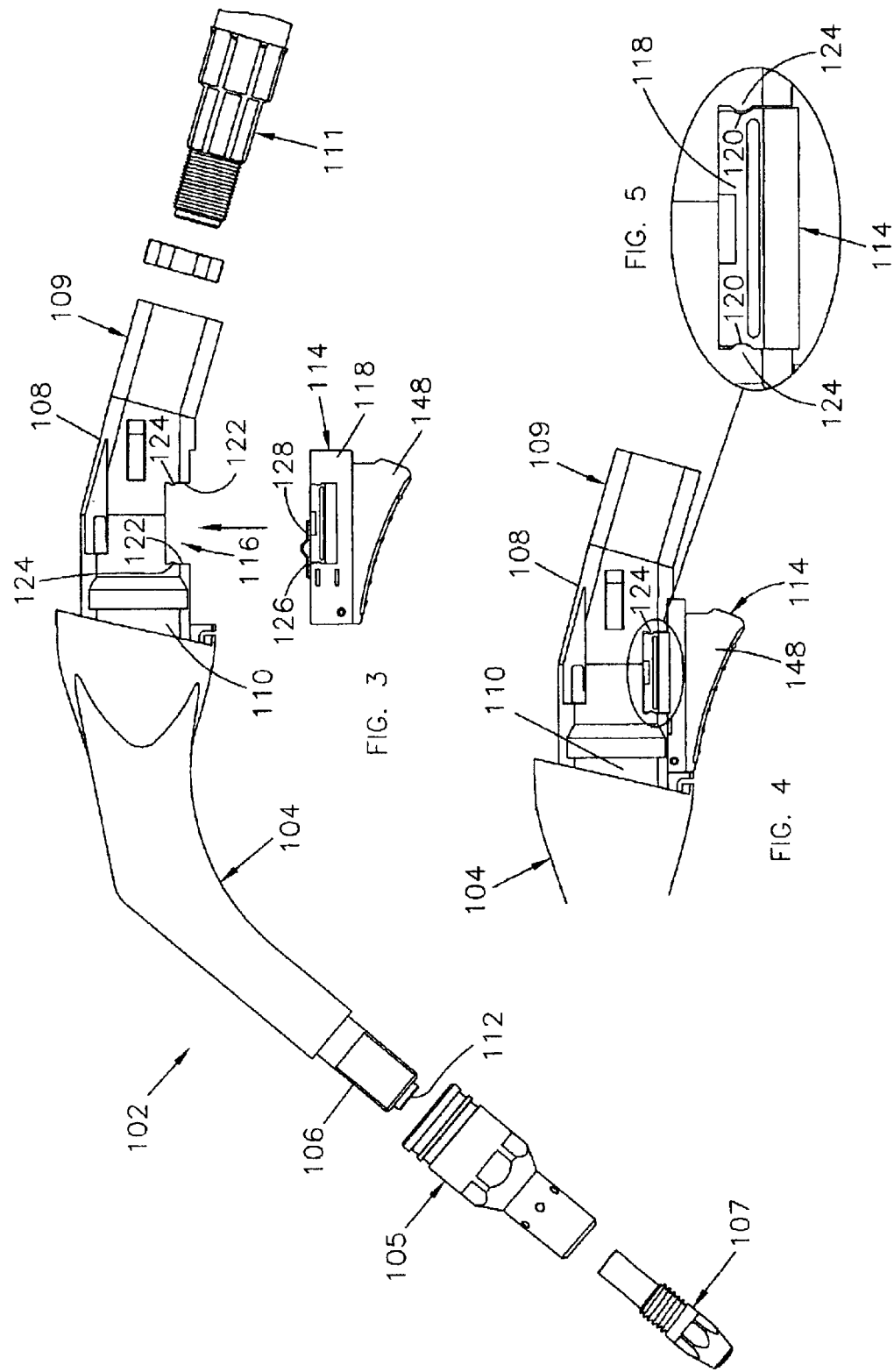

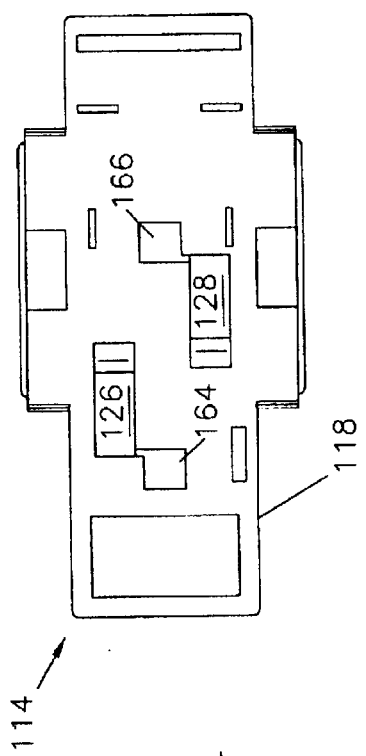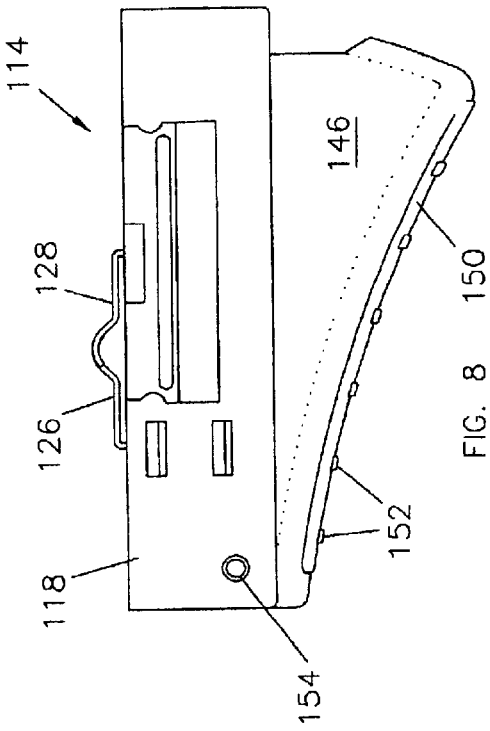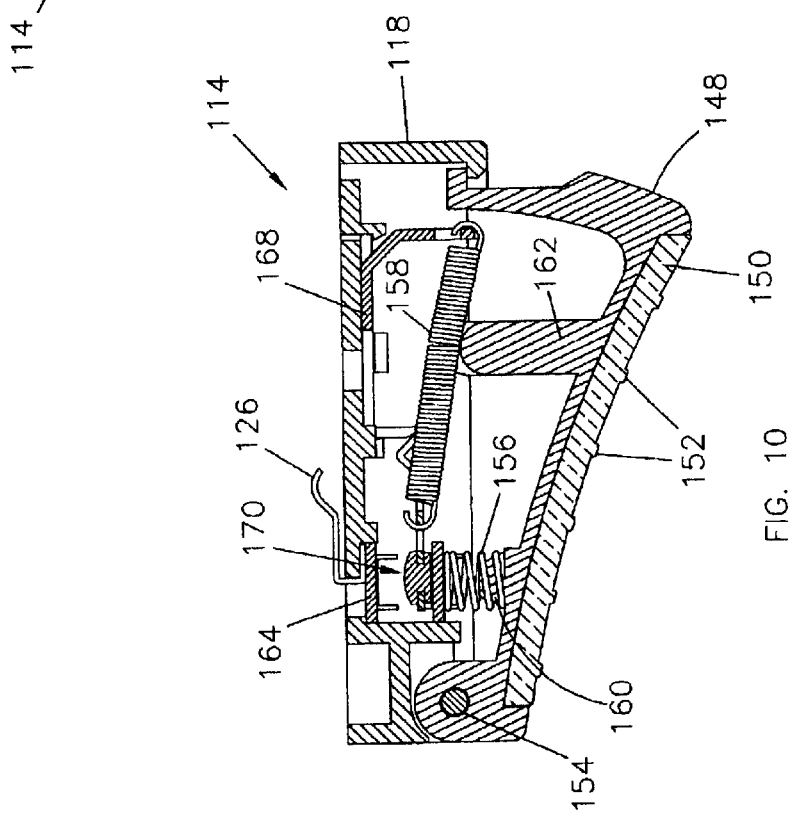

WELDING TORCH FOR USE IN GAS METAL ARC WELDING

FIELD OF THE INVENTION

This invention relates to a welding torch for use in gas metal arc welding.

BACKGROUND OF THE INVENTION

Welding torches for use in gas metal arc welding are well known. The gas metal arc welding is often referred to as MIG (metal inert gas) welding. The known welding torches comprise a neck portion, a diffuser at a first end of the neck portion, a contact tip which extends from the diffuser, and connector means which is at a second end of the neck portion and which is for connecting the neck portion to a power cable assembly. The power cable assembly supplies electricity and gas to the welding torch. The gas is for protecting welds from atmospheric contamination as the welds are made using the welding torch. The welding torch is usually operated by a trigger switch in a handle part of the welding torch.

The neck portion of the welding torch is often referred to a swan neck or a goose neck. The neck portion is such that it comprises an electrical conductor for carrying electrical current to the welding arc that occurs during use of the welding torch. The neck portion also comprises a passageway for the gas. The neck portion operates in a very harsh environment. The neck portion has to protect a welding operator from possible dangers of electrocution. Therefore the strength and insulation integrity of the neck portion are of paramount importance. Insulation designs for the neck portion vary between torch manufacturers but the insulation designs normally fall into two categories. The first category is where the insulation material is rubber tubing or glass weave fabrics and where there is no hard surface protection of the insulation material. The second category is where the insulation material is rubber, fabrics, pressed fibre wrappings or polytetrafluoroethylene tubing, and where the insulation material is provided with hard surface protection in the form of a metal sleeve. The metal sleeve is often referred to as the body armour of the neck portion. With both of these known types of insulation, there is always a possibility that the insulation will slip along the electrical conductor part of the neck portion, usually a copper tube, thereby exposing an electrically live area to the welding operator. In addition, the insulation often utilises poorly fitting insulation joints which are prone to short circuiting due to moisture ingress. Generally, the more components used in the insulation design, then the more likely is the risk of insulation failure.

SUMMARY OF THE INVENTION

It is an aim of the present invention to obviate or reduce the above mentioned problems.

Accordingly, the present invention provides a welding torch for use in gas metal arc welding, which welding torch comprises a neck portion, a diffuser at a first end of the neck portion, a contact tip which extends from the diffuser, connector means which is at a second end of the neck portion and which is for connecting the neck portion to a power cable assembly, and a trigger switch: the power cable assembly being such that it supplies electricity and gas to the welding torch with the gas being for protecting welds from atmospheric contamination as the welds are made using the welding torch; the neck portion being such that it comprises an electrical conductor and a passageway for the gas; the neck portion being such that it comprises insulation in the form of an overmoulding of a plastics material, the overmoulding being such that it also provides rigidity and impact strength to the neck portion; the trigger switch being a snap fit in position in a socket in the neck portion; and the welding torch being one in which the trigger switch comprises a housing and a recess at opposite ends of the housing, and in which walls defining the socket have male profiles for being received in the recesses in order to enable the snap fit in position of the trigger switch in the socket.

The use of the overmoulding of the plastics material overcomes the above mentioned problems with the known insulation. Thus the use of the overmoulding of a plastics material provides the solution to a long established problem that has faced welding torch manufacturers. In addition, the overmoulding is able to provide rigidity and impact strength to the neck portion, thereby providing additional benefits over and above non-slip insulation.

Because of the construction of the neck portion with its electrical conductor, and because of the very harsh environment in which the neck portion operates, the use of the overmoulding of the plastics material is surprising. Initially, one would have thought that the overmoulding would not have been possible because of the environmental conditions to which the neck portion is subjected. However, modern engineering polymer plastics materials have outstanding mechanical, thermal, electrical, dimensional and processing properties and we have realised their potential for use in the construction of the neck portion of the welding torch.

The overmoulding is especially advantageous in that the overmoulding can be to an ergonomic shape. The use of the overmoulding provides the facility to provide the neck portion with a wide variety of outer profile shapes which may be aesthetically pleasing and/or comfortable to welding torch operators.

Any suitable and appropriate plastics materials may be employed. Presently preferred plastics materials are nylon and liquid crystal polymer resins.

The overmoulding may be conducted using known thermoplastic moulding techniques.

The trigger switch operates the stopping and starting of the welding process. The trigger switch is exposed to a lot of use in very arduous environmental conditions. The trigger switch is invariably operated with a heavy gloved hand, which accentuates rough usage of the trigger switch. Failures in the trigger switches thus frequently occur. In addition to the cost of replacing the trigger switches, there is the considerable cost and inconvenience of lost welding time.

Advantageously, the trigger switch is one which is easily replaced because it is a snap fit in position in the socket in the neck portion.

The use of the snap fit trigger switch enables the trigger switch easily to be replaced in the event of failure. The trigger switch is able to be formed as a stand alone module which snaps directly into position in the socket in the neck portion. The trigger switch is able to be manufactured so as to allow easy switch wire connections to be made. A handle cover grip for the neck portion is able to be easily placed in position around the trigger switch, with less chance of accidentally trapping wires than commonly occurs with known trigger switches. Known trigger switches are difficult to install. The known trigger switches are often held in place by two halves of a handle part, and the known trigger switches are prone to sticking because of interference conditions where the two halves of the handle part join.

Preferably, the upper part of the trigger switch carries at least one contact for mating with at least one contact located in the socket.

The overmoulding is advantageous in that the overmoulding can be so shaped as to form mounting and securing means for the trigger switch and the handle, without the need for additional parts.

BRIEF DESCRIPTION OF THE DRAWINGS

Embodiments of the invention will now be described solely by way of example and with reference to the accompanying drawings in which:

FIG. 1 is a longitudinal section through part of a welding torch for use in gas metal arc welding;

FIG. 2 is a perspective view of the welding torch shown in FIG. 1;

FIG. 3 is an exploded view of a welding torch which has the overmoulded plastics material of FIGS. 1 and 2, and which is shown without handle cover grips, but with a trigger switch;

FIG. 4 shows part of the welding torch shown in FIG. 3 in an assembled condition;

FIG. 5 is an enlarged view of part of the welding torch shown in FIG. 4;

FIG. 8 is a side view of the trigger switch shown in FIGS. 3, 4 and 6;

FIG. 9 is a top plan view of the trigger switch as shown in FIG. 8;

FIG. 10 is a cross section on the line A-A shown in FIG. 9; and

DETAILED DESCRIPTION OF THE DRAWINGS

Figure 6:
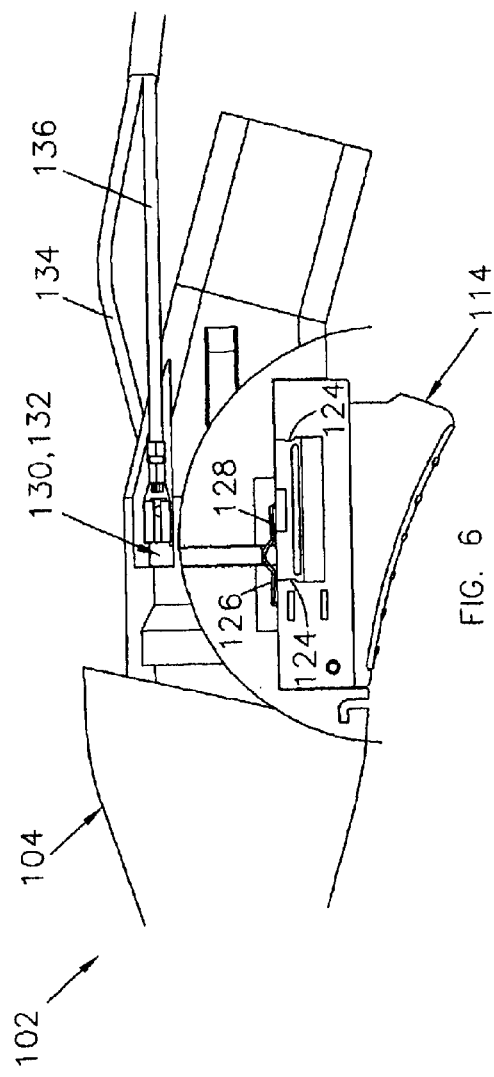
FIG. 6 is a view like FIG. 4 but cut away to show how a trigger switch fits in position and connects to switch wires.

Referring to FIGS. 1 and 2, there is shown a welding torch 2 for use in gas metal arc welding. The gas metal arc welding is known as MIG welding. The welding torch 2 comprises a neck portion 4, a diffuser 6 at a first end 8 of the neck portion 4, a contact tip 10 which extends from the diffuser 6, and connector means 12 which is at a second end 14 of the neck portion 4 and which is for connecting the neck portion 4 to a power cable assembly 16. The power cable assembly 16 is such that supplies electricity and gas to the welding torch 2. The gas is for protecting welds from atmospheric contamination as the welds are made using the welding torch 2.

The neck portion 4 is such that it comprises an electrical conductor 20 and a passageway 22 which extends through the electrical conductor 20 and which is for the gas. The electrical conductor 20 may be of various constructions but it will usually comprise one or more copper tubes. The gas from the neck portion 4 leaves the welding torch 2 through apertures 24 in the diffuser 6.

The neck portion 4 is such that it comprises insulation 26 in the form of an overmoulding of a plastics material. The plastics material is moulded over the electrical conductor. 20 as shown. The overmoulding is such that it provides rigidity and impact strength to the neck portion 4.

It will be appreciated from FIG. 1 that the insulation 26 is such that it cannot slip on the electrical conductor 20. Thus there is no possibility of the insulation 26 slipping and exposing the electrical conductor 20, as occurs in the case of known neck portions of welding torches. An operator of the welding torch 2 will thus not be subjected to the possibility of receiving an electrical shock due to slipped insulation. The insulation 26 will remain firmly in position and, in addition, the insulation 26 provides rigidity for the electrical conductor 20 and therefore for the neck portion 4. Due to the harsh environment in which the neck portion 4 will be operating, it is to be expected that the neck portion 4 will receive blows from time to time. The insulation 26 in the form of the overmoulding provides good impact strength and thus good protection for the electrical conductor 20.

The plastics material used in the insulation 26 is nylon but it may be any suitable and appropriate plastics material, for example a liquid crystal polymer resin. The plastics material may be overmoulded using any suitable and appropriate known thermoplastic moulding techniques.

Referring to FIGS. 3–11, there is shown part of a welding torch 102 for use in gas metal arc welding, often known as MIG (metal inert gas) welding. The welding torch 102 comprises a neck portion 104. A diffuser 105 is provided at a first end of 106 of the neck portion 104. A contact tip 107 extends from the diffuser 105. Connector means 109 is provided at a second end 108 of the neck portion 104. The connector means 109 is for connecting the neck portion 104 to a power cable assembly 111. The power cable assembly 111 is such that it supplies electricity and gas to the welding torch 102. The gas is for protecting welds from atmospheric contamination as the welds are made using the welding torch 102.

The neck portion 104 is such that it comprises an electrical conductor 110 and a passageway 112 for the gas. The neck portion 104 comprises insulation which is like the insulation 26 shown in FIGS. 1 and 2 and which is in the form of an overmoulding of a plastics material. The plastics material is moulded over the electrical conductor 110. The overmoulding is such that it provides rigidity and impact strength to the neck portion 104. The neck portion 104 is also such that it comprises a trigger switch 114.

The trigger switch 114 is a snap fit in position in a socket 116 in the neck portion 104. More specifically, the trigger switch 114 comprises a housing 118 and a recess 120 at opposite ends of the housing 118. Walls 122 defining the socket 116 have male profiles 124 for being received in the recesses 120. This enables the trigger switch 114 to be a snap fit in position in the socket 116.

An upper part of the trigger switch 114 carries a pair of contacts 126, 128 for mating with a pair of contacts 130, 132 in the socket 116. The contacts 130, 132 connect to switch wires 134, 136 as shown in FIG. 6.

Figure 7:
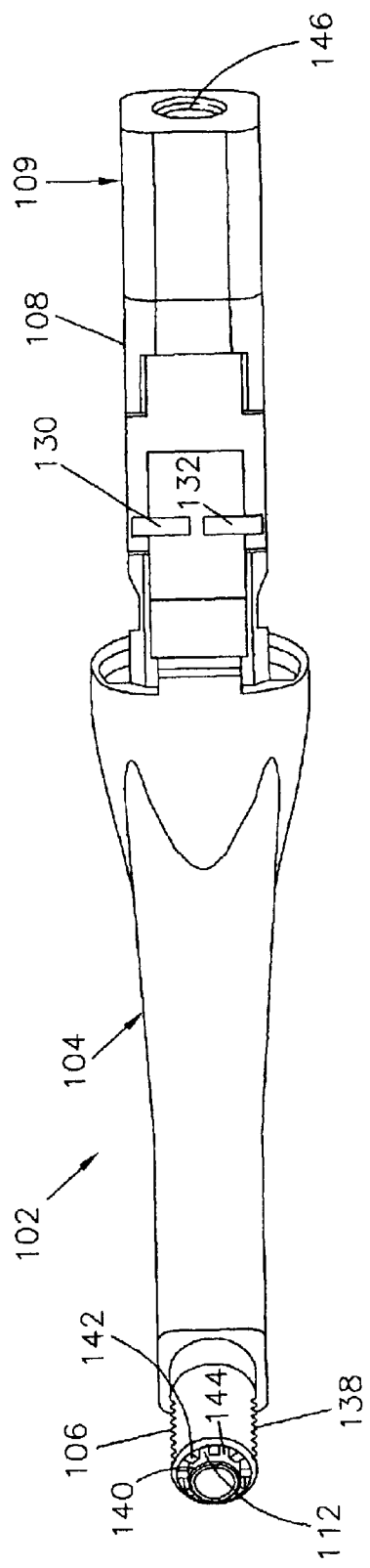
FIG. 7 is an underneath view of part of the welding torch as shown in FIG. 3.

FIG. 7 shows how the first end 106 has a screw threaded portion 138 over which is screwed the diffuser. FIG. 7 also shows how the electrical conductor is in the form of an inner copper tube 140 having a fluted outer profile formed by flutes 142. Spaces 144 between the flutes 142 form the passageway 112 for the gas.

FIG. 7 also shows how the connector means 109 has a screw threaded portion 146 for enabling connection of the connector means for connecting the neck portion 104 to the power cable assembly 111.

FIGS. 8, 9 and 10 show in more detail the construction of the trigger switch 114. The trigger switch 114 comprises a trigger 148. The trigger 148 has a finger grip formation 150 having ridges 152. The finger grip formation 150 may be a separate assembly as shown in FIGS. 8 and 10.

The trigger 148 pivots about a pivot 154. The pivot 154 is located in the housing 118.

A pivot spring 156 is provided inside the housing 118 as shown. A trigger spring 158 is also provided inside the housing 118 as shown. The pivot spring 156 locates on a post 160 formed as part of the trigger 148. The trigger spring 158 rests on a post 162 which is also formed as part of the trigger 148. The free end of the post 162 is curved as shown for receiving the trigger spring 158.

The contact 126 has a contact plate 164 located in the housing 118. Similarly, the contact 128 has a contact plate 166 located in the housing 118. The trigger spring 158 is held at its right hand end by a spring carrier 168.

The upper end of the pivot spring 156 is held in position by a snap contact assembly 170.

Figure 11:
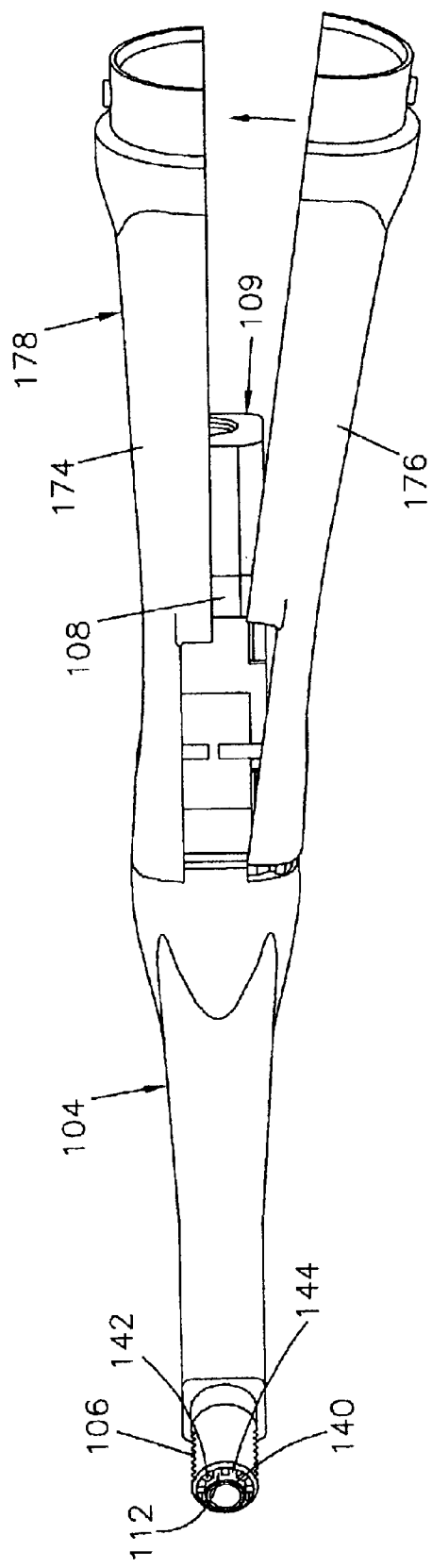
FIG. 11 is a view from underneath and shows a handle cover grip being snapped in position over the neck portion as shown in FIG. 7.

The neck portion 104 of the welding torch 102 is easily assembled with the trigger switch 114. When the trigger switch 114 is fully located in the socket 116, the electrical connections are automatically made. The trigger switch 114 is designed for positive "whip" action on and off of the striking contacts, in order to eliminate low pressure arcing. As shown in FIG. 11, once the trigger switch 114 is in position, the two parts 174, 176 of a cover 178 for the neck portion 104 are easily placed around the trigger switch 114, with less chance of accidentally trapping electrical wires than commonly occurs with known trigger switch designs. Still further, the trigger switch 114 is able to operate simply and easily without any tendency to stick, as often occurs with known trigger switch designs.

It is to be appreciated that the embodiments of the invention described above with reference to the accompanying drawings have been given by way of example only and that modifications may be effected. Thus, for example, the insulation 26 may be overmoulded to ergonomic shapes other than as shown in the drawings. The trigger 48 may be of a different profile to that shown. The various illustrated contacts 26, 28, 30, 32 may also be of different shapes to those shown. The trigger switch has been shown as a snap fit in a socket of the neck portion of the welding torch. If desired, the trigger switch could be positioned elsewhere, for example in the handle or in a mounting block fitted inside the handle.

What is claimed is:

1. A welding torch for use in gas metal arc welding, which welding torch comprises a neck portion, a diffuser at a first end of the neck portion, a contact tip which extends from the diffuser, connector means which is at a second end of the neck portion and which is for connecting the neck portion to a power cable assembly, and a trigger switch: the power cable assembly being such that it supplies electricity and gas to the welding torch with the gas being for protecting welds from atmospheric contamination as the welds are made using the welding torch; the neck portion being such that it comprises an electrical conductor and a passageway for the gas; the neck portion being such that it comprises insulation in the form of an overmoulding of a plastics material, the overmoulding being such that it also provides rigidity and impact strength to the neck portion; the trigger switch being a snap fit in position in a socket in the neck portion; and the welding torch being one in which the trigger switch comprises a housing and a recess at opposite ends of the housing, and in which walls defining the socket have male profiles for being received in the recesses in order to enable the snap fit in position of the trigger switch in the socket.

2. A welding torch according to claim 1 in which the overmoulding is of an ergonomic shape.

3. A welding torch according to claim 1 in which the plastics material is nylon or a liquid crystal polymer resin.

4. A welding torch according to claim 1 in which an upper part of the trigger switch carries at least one contact for mating with at least one contact located in the socket.

* * * * *